May 15, 1956  E. O. LUNDE  2,745,360
HOPPER OUTLET VALVE STRUCTURE
Filed July 14, 1952  2 Sheets-Sheet 1
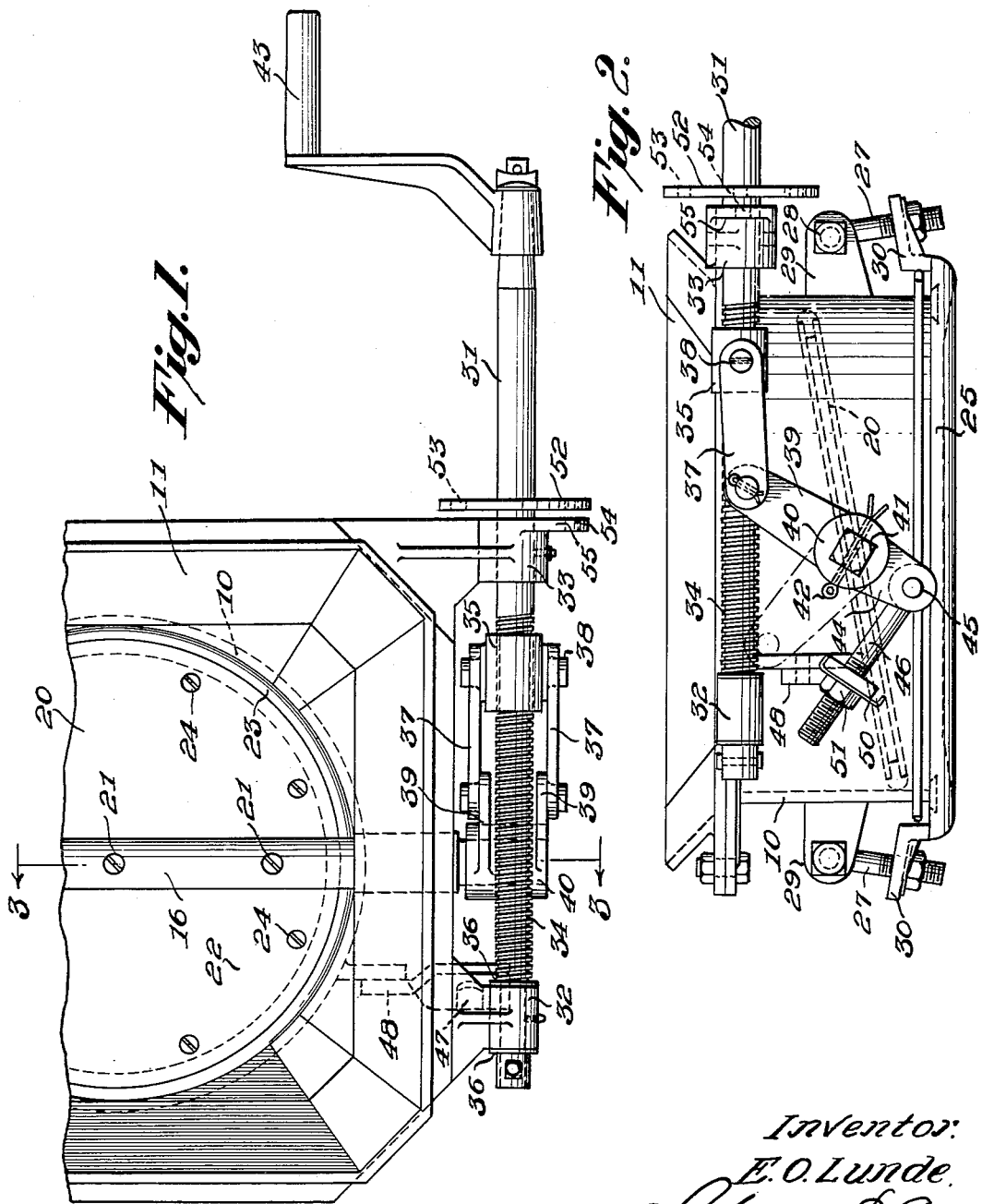
Inventor:
E. O. Lunde
George E. Cook
Attorney May 15, 1956 E. O. LUNDE 2,745,360
HOPPER OUTLET VALVE STRUCTURE
Filed July 14, 1952 2 Sheets-Sheet 2
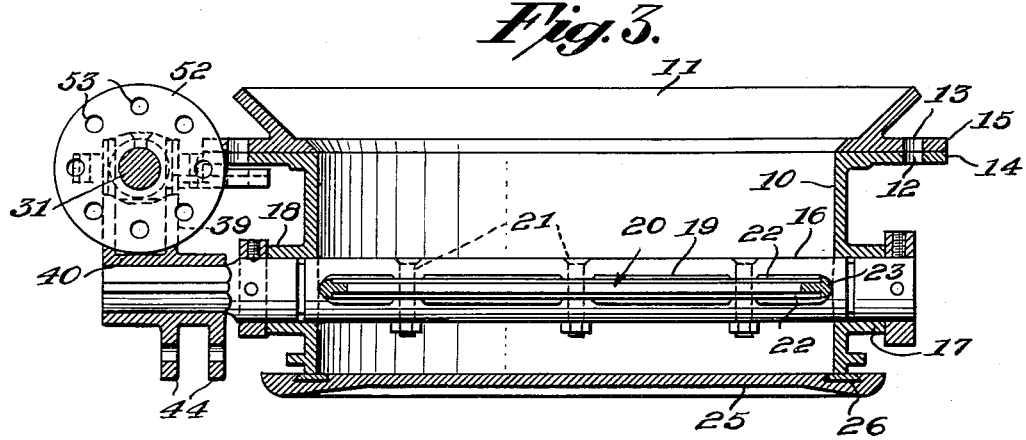
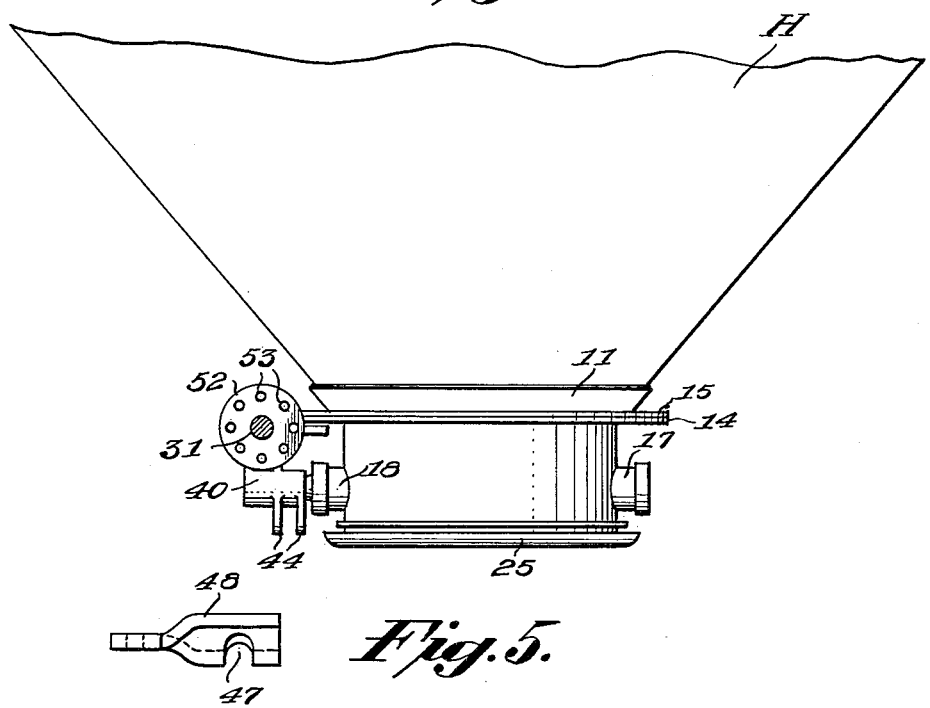
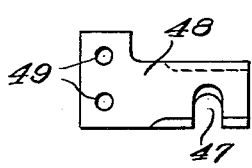
INVENTOR.
E. O. Lunde
BY George E. Cook
Attorney

United States Patent Office 2,745,360
Patented May 15, 1956

2,745,360

HOPPER OUTLET VALVE STRUCTURE

Einar O. Lunde, Wyckoff, N. J., assignor to Magor Car Corporation, New York, N. Y., a corporation of Delaware Application July 14, 1952, Serial No. 298,855

4 Claims. (Cl. 105—307)

This invention relates to a hopper outlet valve structure.

The invention is more particularly concerned with a valve structure for operative association with the lower or outlet end of a freight car hopper, and is adapted for retaining the contents of the car therewithin during transit and for permitting regulated discharge of the contents therefrom.

A primary object of the invention is a valve structure for the above noted purpose which includes manually operable means readily accessible from a side of the car and wherein the manually operable means is capable of being locked in inoperative position during transit of the car.

A further object of the invention is the provision of seal attaching means for ascertaining whether or not unauthorized attempts have been made to operate the valve.

A still further object of the invention is to provide a hopper outlet valve structure including a cylindrical housing having a butterfly valve rotatably supported therein, and screw and lever means operatively associated with the valve and which means is manually operable from a side of the car.

Other objects and advantages of the invention will become apparent in the course of the following detailed description, taken in connection with the accompanying drawings, wherein:

Fig. 1 is a fragmental top plan view of the valve structure in accordance with a preferred structural embodiment thereof.

Fig. 2 is a broken side elevational view of the structure shown in Fig. 1.

Fig. 3 is a vertical transverse sectional view in the plane of line 3—3 on Fig. 1.

Fig. 4 is a broken elevational view showing the assembly of the valve structure with a freight car hopper.

Figs. 5 and 6 are respectively a top plan and side elevational views of a bracket entering into the valve structure.

Referring now in detail to the drawings, 10 designates a cylindrical housing to the upper end of which is secured a member 11 for receiving the open end of a hopper H. The connection of housing 10 and member 11 is preferably effected by means of bolts projecting through aligned apertures 12 and 13 in flanges 14 and 15 respectively, projecting radially from the housing and member.

A shaft 16 extends diametrically through the housing 10 adjacent the lower end thereof and is rotatably journalled in diametrically opposed portions of the wall of housing 10 as indicated at 17 and 18. The shaft 16 is provided with a diametrical slot which extends axially of the shaft to points adjacent the bearings 17 and 18 as is clearly indicated in Fig. 3.

A butterfly valve 20 extends through the slot 19 and has a diametrical portion disposed therein and the valve is retained in assembled relation with the shaft 16 by means of a plurality of bolts 21.

The butterfly valve 20 comprises a pair of circular metallic plates 22 between the margins of which is interposed a rubber ring 23 which has sealing engagement with the inner wall of housing 10 in the closed position of the valve and the ring is retained in position between the plates by means of screws or bolts 24 extending through the plates.

The housing 10 is provided with a bottom cover 25 provided with a gasket 26 sealingly engageable with the lower circular edge of the housing. The cover is removably retained in position by a plurality of bolts 27 whose upper ends are pivotally secured as at 28 between a pair of lugs 29 projecting outwardly from housing 10 and the lower threaded ends of the bolts are swingable into a slotted opening in a bracket 30 secured to the cover 25.

The valve carrying shaft 16 is operable by a shaft 31 which is disposed at right angles to shaft 16 and is rotatably journalled in a pair of bearing members 32 and 33 which project from and are rigidly supported by the housing 10 in a position whereby shaft 31 is disposed above shaft 16 and adjacent the upper end of the housing as is clearly apparent in Fig. 2.

The forward end of shaft 31 is provided with a thread 34 which is operatively engaged by a nut 35, the shaft being retained against axial movement by means of flanges 36 engaging opposite ends of bearing member 32. A pair of arms 37 are disposed at opposite sides of shaft 31 and have corresponding ends thereof pivoted to nut member 35 as at 38.

The opposite ends of arms 37 are pivotally connected to the outer free ends of lugs 39 which are integral with and project outwardly from a hub member 40 which is retained on the squared end 41 of shaft 16 by means of a cotter 42.

From the above, it will be seen that upon rotation of shaft 31 in one direction or the other the nut member 35 will be correspondingly moved axially thereof and through the arms 37 and lugs 39 the shaft 16 will be rotated and move the butterfly valve 20 into closed or open position.

The shaft 31 is provided with an operating handle 43 and the shaft is of sufficient length that the handle will be readily accessible at a side of the car.

Means are provided to lock the shafts 16 and 31 against valve opening operation during transit of the car and such means comprises a pair of lugs 44 projecting downwardly from the hub member 40 and between which is pivoted as at 45 one end of a lock bolt 46. The opposite threaded end of bolt 46 is swingable into and out of a slot 47 (Figs. 5 and 6) in a bracket 48 which is rigidly secured to housing 10 by means of suitable fasteners extending through apertures 49 in the bracket.

A flanged locking member 50 is supported on bolt 46 for movement axially thereof and which when engaged with the bracket as shown in Fig. 2 prevents the bolt from falling out of slot 47.

A nut 51 on the bolt locks same in position.

Means are associated with the valve operating means for detecting any unauthorized tampering therewith and such means preferably comprises a disk 52 rigid with shaft 31 and which is provided with a plurality of circumferentially disposed apertures 53 for successive alignment with an aperture 54 in a lug 55 projecting from the bearing member 33.

A seal of well known form may be extended through aligned apertures 53, 54.

While I have disclosed my invention in accordance with a single specific embodiment thereof, such is to be considered as illustrative only, and not restrictive, the scope of the invention being defined in the subjoined claims.

What I claim and desire to secure by U. S. Letters Patent is:

1. In a hopper outlet valve structure, a cylindrical housing, a hopper receiving member supported on the housing, a shaft extending diametrically through the housing, a butterfly valve supported by the shaft and cooperating with the inner wall of the cylindrical housing, an operating shaft supported by the housing externally thereof and being disposed above and at right angles to the first shaft, operative connections between the two shafts, said first shaft being provided with a diametrical slot of substantial extent axially thereof, said butterfly valve extending through said slot, means securing said valve to said first shaft, said butterfly valve including a pair of parallel spaced disk plates and a rubber ring secured between the margins of said plates and including an exposed head portion for cooperation with the inner wall of said housing.

2. In a hopper outlet valve structure, a cylindrical housing, a hopper receiving member supported on the housing, a shaft extending diametrically through the housing, a butterfly valve supported by the shaft and cooperating with the inner wall of the cylindrical housing, an operating shaft supported by the housing externally thereof and being disposed above and at right angles to the first shaft, operative connections between the two shafts, said operative connections between the two shafts comprising a thread on the operating shaft, a nut cooperating with the thread, a hub member secured to the first shaft and having a pair of lugs projecting therefrom, a pair of links pivotally connected to the nut and the lugs, locking means cooperating with said hub and the housing, said locking means comprising a slotted bracket supported by the housing, a pair of lugs depending from the hub member, a bolt having a head pivotally connected to said lugs, the bolt being swingable into and out of said slot, and means for retaining the bolt in said slot.

3. In a hopper outlet valve structure, a cylindrical housing, a shaft extending diametrically through said housing, a butterfly valve supported by the shaft and cooperating with the inner wall of said housing, an operating shaft supported by the housing externally thereof, operative connections between said shafts, said first shaft being provided with a pair of lugs projecting radially therefrom, a bracket supported by the housing and having an open ended slot therein, a bolt having a head pivotally connected to said lugs, the bolt being swingable into and out of said slot, and means for retaining the bolt in said slot.

4. The structure according to claim 3, wherein said means comprises a flanged locking member supported on said bolt for axial movement thereon, and a nut on the threaded end of the bolt engageable with said locking member for retaining same in locking engagement with said bracket.

References Cited in the file of this patent

UNITED STATES PATENTS

| | | |
|---|---|---|
| 1,161,460 | Doble | Nov. 23, 1915 |
| 1,949,555 | Woehle | Mar. 6, 1934 |
| 1,951,283 | Kinzie et al. | Mar. 13, 1934 |
| 2,073,513 | Dietrichson et al. | Mar. 9, 1937 |
| 2,105,343 | Briggs | Jan. 11, 1938 |
| 2,222,280 | Batho | Nov. 19, 1940 |